United States Patent [19]

Cole et al.

[11] Patent Number: 5,105,854

[45] Date of Patent: Apr. 21, 1992

[54] HOSE CONSTRUCTION FOR CONVEYING WATER UNDER PRESSURE

[75] Inventors: Richard W. Cole, Nixa; Dennis W. Geren, Springfield, both of Mo.; Warren D. Stubblefield, Centerville, Ohio

[73] Assignee: Dayco Products, Inc., Dayton, Ohio

[21] Appl. No.: 521,285

[22] Filed: May 9, 1990

[51] Int. Cl.$^5$ .............................................. F16L 33/20
[52] U.S. Cl. .................................. 138/109; 138/125; 138/126; 285/149; 285/256
[58] Field of Search ............... 138/109, 178, 125, 126; 285/149, 256, 259

[56] References Cited

U.S. PATENT DOCUMENTS

| | | | |
|---|---|---|---|
| 1,562,954 | 11/1925 | Goodall | 138/109 |
| 2,171,945 | 9/1939 | Norgren | 285/256 |
| 2,452,728 | 11/1948 | Carling | 285/256 |
| 3,243,208 | 3/1966 | Lalikos et al. | 285/256 |
| 3,711,131 | 1/1973 | Evans | 285/256 |
| 4,226,446 | 10/1980 | Burrington | 285/256 |
| 4,431,031 | 2/1984 | Ettlinger | 138/109 |
| 4,453,746 | 6/1984 | Keenan | 285/256 |
| 4,804,212 | 2/1989 | Vyse | 285/256 |

FOREIGN PATENT DOCUMENTS

| | | | |
|---|---|---|---|
| 630908 | 11/1961 | Canada | 285/256 |
| 892082 | 3/1962 | United Kingdom | 285/256 |
| 1035888 | 7/1966 | United Kingdom | 138/109 |
| 2216971 | 10/1989 | United Kingdom | 285/259 |

Primary Examiner—James E. Bryant, III
Attorney, Agent, or Firm—Joseph V. Tassone

[57] ABSTRACT

A hose construction for conveying water under pressure, a stem therefor and methods of making the same are provided, the hose construction comprising a flexible tubular hose having opposed ends, a metallic stem having opposed ends and having one of the ends thereof disposed in one of the ends of the hose, and a metallic tubular ferrule telescoped on the one end of the hose and being radially inwardly crimped toward the stem to compress the end of the hose between the ferrule and the stem, the one end of the stem having a plurality of annular spaced apart projections thereon and respectively having external peripheral surfaces embedded into the one end of the hose, the stem having an opening passing therethrough and defining an internal peripheral surface thereof, the one end of the stem terminating at an end edge thereof that is defined by the internal peripheral surface joining with the external peripheral surface of an adjacent annular projection the end edge defining a relatively large rounded end part on the stem that prevents the end part of the stem from being razored by water flow and from cutting into the hose when the hose is being bent relative to the stem adjacent the end part thereof.

9 Claims, 3 Drawing Sheets

HOSE CONSTRUCTION FOR CONVEYING WATER UNDER PRESSURE

BACKGROUND OF THE INVENTION

1. Field of the Invention

This invention relates to a new hose construction for conveying water under pressure, a new metallic stem therefor and to new methods of making the hose construction and the stem.

2. Prior Art Statement

It is known to provide a hose construction for conveying water under pressure and comprising a flexible tubular hose having opposed ends, a metallic stem having opposed ends and having one of the ends thereof disposed in one of the ends of the hose, and a metallic tubular ferrule telescoped on the one end of the hose and being radially inwardly crimped toward the stem to compress the end of the hose between the ferrule and the stem, the one end of the stem having a plurality of annular spaced apart projections thereon and respectively having external peripheral surfaces embedded into the one end of the hose, the stem having an opening passing therethrough and defining an internal peripheral surface thereof, the one end of the stem terminating at an end edge thereof that is defined by the internal peripheral surface joining with the external peripheral surface of an adjacent annular projection. For example, see the U.S. Pat. No. 4,431,031 to Ettlinger.

SUMMARY OF THE INVENTION

It is one of the features of this invention to provide a new hose construction for conveying water under pressure wherein the end of a metallic stem that is disposed in one end of the hose construction is so constructed and arranged that the same will not be readily razored by the water flow therethrough and thereby is prevented from cutting into the flexible hose of the hose construction when the hose is being bent relative to the stem adjacent the end part thereof.

In particular, it was found according to the teachings of this invention that prior known metallic stems each tend to be razored by the water flow through the hose construction so that the same readily cuts into the hose when the hose is bent relative to the end part of that stem.

Therefore, it was found according to the teachings of this invention that the end part of a metallic stem can be made relatively thick and be rounded in such a manner that the same will not tend to be razored by the water flow and thereby will not tend to cut into the end of the flexible hose when the hose is bent relative to the end part of the stem.

For example, one embodiment of this invention comprises a hose construction for conveying water under pressure and comprising a flexible tubular hose having opposed ends, a metallic stem having opposed ends and having one of the ends thereof disposed in one of the ends of the hose, and a metallic tubular ferrule telescoped on the one end of the hose and being radially inwardly crimped toward the stem to compress the end of the hose between the ferrule and the stem, the one end of the stem having a plurality of annular spaced apart projections thereon and respectively having external peripheral surfaces embedded into the one end of the hose, the stem having an opening passing therethrough and defining an internal peripheral surface thereof, the one end of the stem terminating at an end edge thereof that is defined by the internal peripheral surface joining with the external peripheral surface of an adjacent annular projection, the end edge defining a relatively large end part on the stem that prevents the end part of the stem from being razored by water flow and from cutting into the hose when the hose is being bent relative to the stem adjacent the end part thereof.

Accordingly, it is an object of this invention to provide a new hose construction for conveying water under pressure, the new hose construction of this invention comprising one or more of the novel features of this invention as set forth above or hereinafter shown or described.

Another object of this invention is to provide a new method of making such a hose construction, the method of this invention comprising one or more of the novel features of this invention as set forth above or hereinafter shown or described.

Another object of this invention is to provide a new metallic stem for such a hose construction, the stem of this invention having one or more of the novel features of this invention as set forth above or hereinafter shown or described.

Another object of this invention is to provide a new method of making such a stem, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
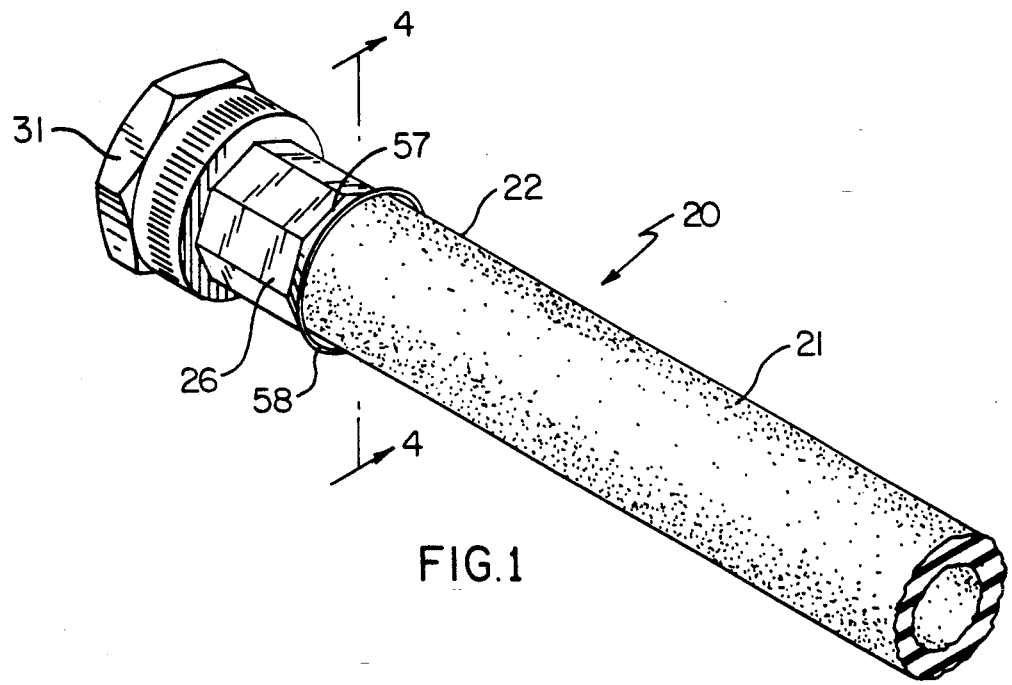
FIG. 1 is a fragmentary perspective view illustrating the new hose construction of this invention.

While the various features of this invention are hereinafter illustrated and described as being particularly adapted to provide a hose construction for conveying water under pressure, it is to be understood that the various features of this invention can be utilized singly or in various combinations thereof to provide a hose construction for conveying other fluids as desired.

Therefore, this invention is not to be limited to only the embodiment illustrated in the drawings, because the drawings are merely utilized to illustrate one of the wide variety of uses of this invention.

Figure 4:
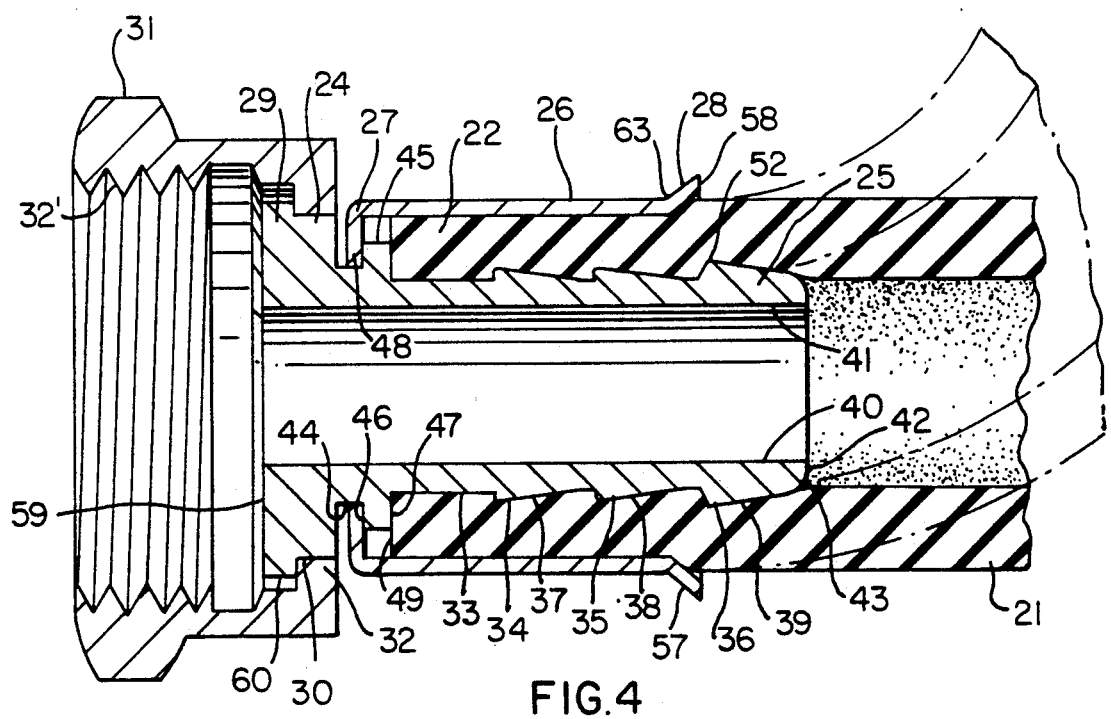
FIG. 4 is a view similar to FIG. 3 and illustrates the hose construction parts after the same have been crimped together, FIG. 4 being basically an enlarged cross-sectional view taken on line 4—4 of FIG. 1.

Referring now to FIGS. 1 and 4, the new hose construction of this invention for conveying water under pressure is generally indicated by the reference numeral 20 and comprises a flexible tubular hose 21 having opposed ends of which only one opposed end 22 is illustrated in the drawings. However, it is to be understood that the other nonshown opposed end of the hose 21 is substantially identical to the end 22 thereof and could have structure interconnected thereto in the same manner as provided by the end 22 and hereinafter set forth, if desired.

Figure 5:
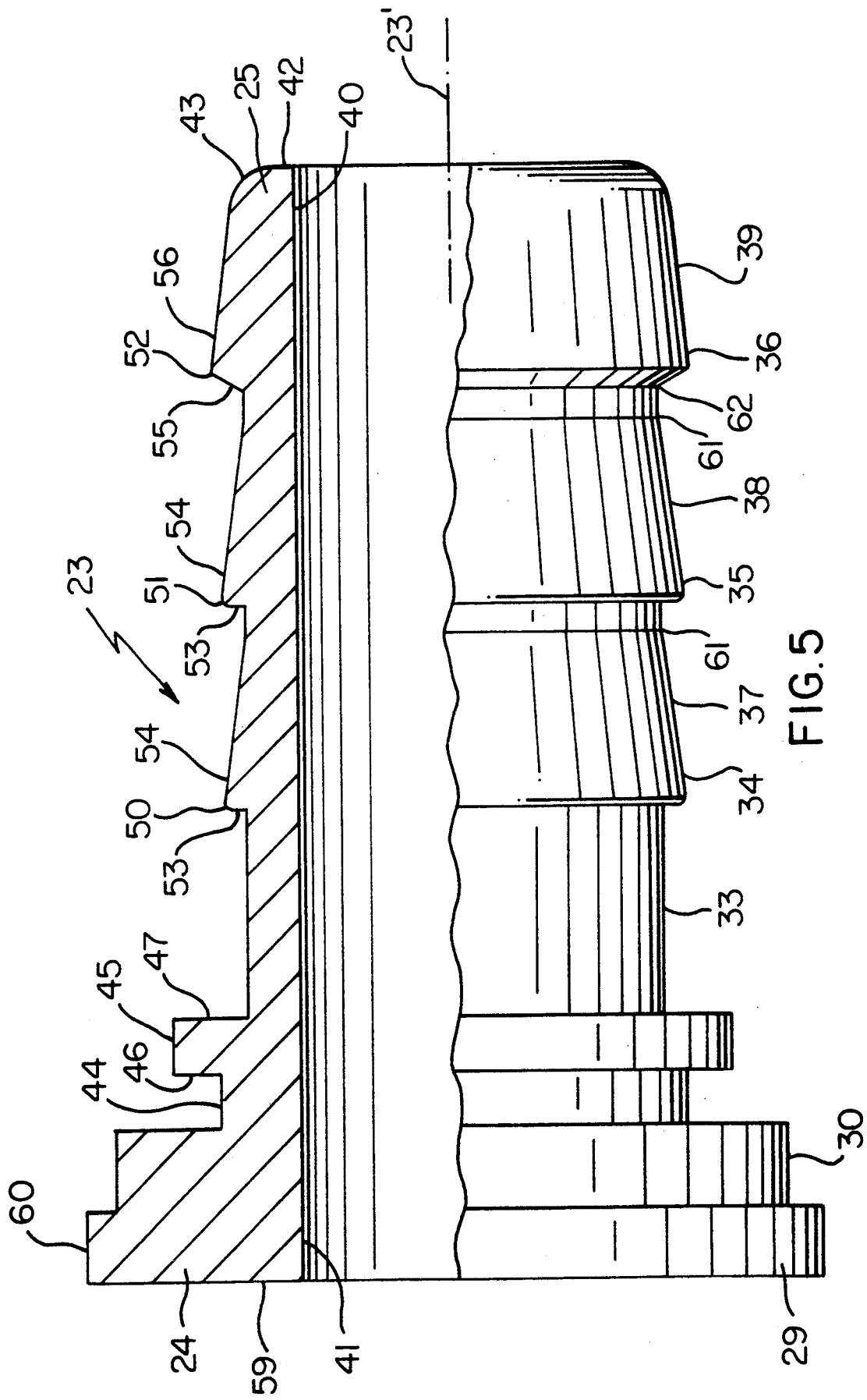
FIG. 5 is an enlarged view, partially in cross section and partially in elevation, of the new metallic stem of this invention utilized to form the hose construction of FIGS. 1–4.

The hose construction 20 also comprises a metallic stem of this invention that is generally indicated by the reference numeral 23 in FIG. 5, the stem 23 having opposed ends 24 and 25 and the end 25 is disposed in the end 22 of the hose.

The hose construction 20 also comprises a metallic tubular ferrule 26 that is telescopically disposed on the one end 22 of the hose 21 and is radially inwardly crimped toward the stem 23 from one end 27 of the ferrule 26 to almost the other end 28 thereof as illustrated in FIG. 4 to compress the end 22 of the hose 21 between the ferrule 26 and the stem 23.

The end 24 of the stem 23 has an annular flange 29 extending outwardly from an annular shoulder 30 thereof so that a metallic collar or swivel 31 can have an inwardly directed annular flange 32 thereof rotatably disposed about the shoulder 30 and being of a size so as to be retained by the flange 29 in the manner illustrated in FIG. 4 whereby the collar 31 can have internal threads 32' thereof for coupling the hose construction 20 to any desired structure, such as coupling to a high pressure water line for a washing machine application or the like in substantially the same manner as set forth in the aforementioned U.S. Pat. No. 4,431,031 to Ettlinger, whereby this U.S. patent is being incorporated into this disclosure by this reference thereto.

Therefore, it can be seen that the hose construction 20 of this invention comprises the flexible hose 21, stem 23, ferrule 26 and collar 31 interconnected together by the method of this invention in a manner hereinafter set forth.

While the flexible hose 21 can be formed of any suitable material and in any suitable manner, one working embodiment thereof has an inside diameter of approximately 0.500 of an inch and an outside diameter of approximately 0.875 of an inch whereby the hose wall thickness is approximately 0.188 of an inch, such flexible hose 21 having an inner tube formed of nitrile rubber, a first rayon cord braid disposed on the tube, a jacket of nitrile rubber disposed on the first braid layer, a second braid layer similar to the first braid layer disposed on the jacket and then a cover of nitrile/PVC rubber disposed on the second braid layer whereby such resulting flexible hose 21 has a burst strength at room temperature of approximately 1700 PSI and a hot burst strength at 180° F. of approximately 1350 PSI.

The end 25 of the metallic stem 23 has a generally cylindrical external peripheral surface 33 and a plurality of annular spaced apart projections 34, 35 and 36 thereon and respectively having external peripheral surfaces 37, 38 and 39 extending outwardly beyond the cylindrical external peripheral surface 33 and being embedded into the one end 22 of the hose 21 in the manner illustrated in FIG. 4 to retain the end 22 of the hose 21 on the stem 23 in the arrangement illustrated in FIGS. 1 and 4.

The stem 23 has a cylindrical opening 40 passing completely therethrough and defining an internal peripheral surface 41 thereof.

The one end 25 of the stem 23 terminates at an end edge 42 thereof that is defined by the interal peripheral surface 41 joining with the external peripheral surface 39 of the adjacent annular projection 36 as illustrated in FIGS. 4 and 5, the end edge 42 being a full radius and thereby defining a relatively large rounded end part 43 on the stem 23 that prevents the end part 43 from being razored by water flow through the hose construction 20 and thereby prevents the end part 43 from cutting into the hose 21 when the hose is being bent relative to the stem 23 adjacent the end part 43 thereof as illustrated by the phantom lines in FIG. 4.

The end 24 of the stem 23 has an annular groove 44 formed between the annular shoulder 30 thereof and another annular shoulder 45 thereof that defines opposed spaced apart transverse flat annular surfaces 46 and 47 as illustrated.

In this manner, the end 27 of the ferrule 26 has an inwardly turned part 48 that is adapted to be disposed in the annular groove 44 and when the same is radially inwardly crimped in the manner illustrated in FIG. 4, the turned part 48 at the end 27 of the ferrule 26 is forced inwardly into the groove 44 and is pulled against the surface 46 of the annular shoulder 45 to positively interconnect the ferrule 26 to the stem 23 while the end 22 of the hose 21 is adapted to have its annular transverse end surface 49 abutted against the other surface 47 of the shoulder 45 of the stem 23 in the manner illustrated in FIG. 4.

The annular projections 34, 35 and 36 of the stem 23 respectively have outwardly directed annular apexes 50, 51 and 52 with the apexes 50 and 51 of the annular projections 34 and 35 being relatively sharp as the same are respectively defined by two relatively flat surfaces 53 and 54 that join together with a small radius at the apexes 50 and 51 as illustrated in FIG. 5, the surfaces 53 being substantially transverse to a longitudinal axis 23' of the stem 23 while the surfaces 54 slope at an angle relative to the axis 23' as illustrated.

In contrast, the annular projection 36 has its apex 52 defined by two flat surfaces 55 and 56 that both slope relative to the longitudinal axis 23' and join together with a small radius at the apex 52 so that the apex 52 is relatively blunt when compared to the apexes 50 and 51.

In this manner, when the ferrule 26 is inwardly crimped from the end 27 thereof toward the end 28 thereof, the end 28 is defined by an angled part 57 that terminates at a free end 58 that is uncrimped with the free end edge 58 being disposed generally short of the apex 52 of the end projection 36 in the manner illustrated in FIG. 4 so as to prevent the apex 52 of the projection 36 from adversely cutting into the hose 22 when the same is bent in the manner illustrated by phantom lines in FIG. 4 so as to complement the rounded end part 43 of the stem 23 in preventing a cutting into the hose 22 for the reasons previously set forth.

While the metallic stem 23 of this invention can be formed of any suitable material and in any suitable manner, the same can be formed of brass, such as CA-360 brass that is suitably machined into the configuration illustrated in the drawings. Similarly, the swivel or collar 31 can be formed of brass, such as the aforementioned CA-360 brass that is suitably machined into the configuration illustrated in the drawings. The ferrule 26 can be formed from cartridge brass and in the one working embodiment of the invention can have a wall thickness of approximately 0.025 of an inch to approximately 0.032 of an inch.

In the one working embodiment of the hose construction 20 of this invention, the stem 23 can have an overall length from the end surface 42 thereof to the other end surface 59 thereof of approximately 1.304 of an inch while the distance from the wall 47 of the annular shoulder 45 to the end part 42 is approximately 1.000 of an inch. The internal diameter of the stem 23 that is defined by the internal peripheral surface 41 of the stem 23 is approximately 0.380 of an inch while the external peripheral surface 50 of the stem 23 defines a diameter of approximately 0.500 of an inch, the diameter of an outer surface 60 of the flange 29 being approximately 0.880 of an inch while the diameter of the shoulder 45 is approximately 0.675 of an inch. The surfaces 54 of the projections 34 and 35 each slopes at an angle of approximately 8° relative to the longitudinal axis 23' and respectively extend a distance from the apexes 50 and 51 thereof to points 61 on the external peripheral surface 33 of approximately 0.150 of an inch while the distance from the point 61 to the next surface 53 or 55 of the adjacent projections 35 and 36 is approximately 0.100 of an inch. The apexes 50 and 51 of the projections 34 and 35 each define a diameter of approximately 0.542 of an inch whereas the apex 52 of the end projection 36 defines a diameter of approximately 0.560 of an inch. The surface 55 of the projection 36 is disposed at an angle of approximately 60° relative to a plane that is transverse to the longitudinal axis 23' (or the surface 55 is disposed at an angle of approximately 30° relative to the longitudinal axis 23') while the surface 56 thereof slopes at an angle of approximately 7° relative to the longitudinal axis 23' and the distance from a point 62 on the external peripheral surface 33 of the stem 23 that forms the beginning of the wall 55 of the projection 36 to the end surface 42 of the stem 23 is approximately 0.250 of an inch.

In such one working embodiment of this invention, the ferrule 26 is inwardly compressed by conventional die fingers, such as by a crimping apparatus set forth in the U.S. Pat. No. 4,625,539 to Brooks et al, which patent is incorporated into this disclosure by this reference thereto, from the end 27 thereof to a point 63 as illustrated in FIG. 4 which is a distance of approximately 0.775 of an inch so that the resulting high and low outside dimensions of the crimped ferrule 26 are respectively approximately 0.856 of an inch and approximately 0.852 of an inch whereas the overall length of the ferrule 26 from the end 27 to the free end point 58 is approximately 0.843 of an inch.

Figure 2:
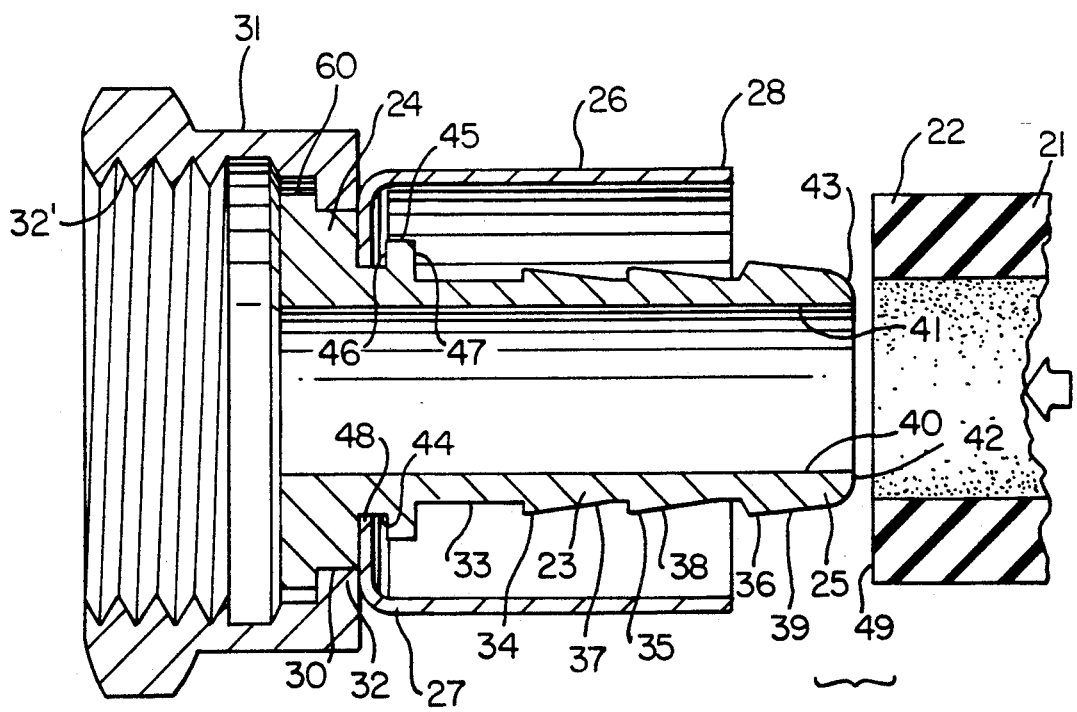
FIG. 2 is an enlarged fragmentary cross-sectional view illustrating how the various parts of the hose construction of FIG. 1 are to be initially assembled together.
Figure 3:
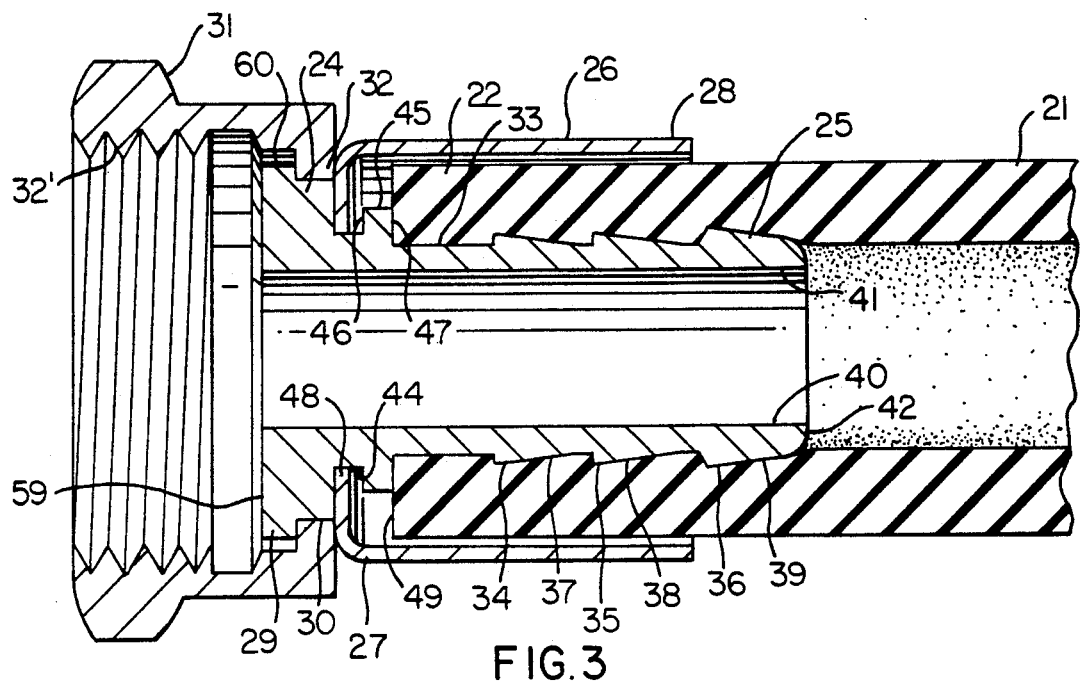
FIG. 3 is a view similar to FIG. 2 and illustrated the hose construction parts in a fully telescoped condition thereof.

Therefore, it can be seen that it is a relatively simple method of this invention to form the hose construction 20 in the manner previously described by assembling the uncrimped ferrule 26 to the stem 23 after the swivel or collar 31 has been assembled thereto in the manner illustrated in FIG. 2. Thereafter, the end 22 of the hose 21 is forced over the end part 43 of the stem 23 from the position illustrated in FIG. 2 to the position illustrated in FIG. 3 wherein the end surface 49 of the hose 21 abuts the surface 47 of the stem 23. Thereafter, the ferrule 26 is inwardly crimped by conventional apparatus from the end 27 thereof to the point 63 so as to radially inwardly compress the end 22 of the hose 21 between the stem 23 and the ferrule 26 to secure the hose end 22 on the stem 23 in the manner previously set forth to form the hose construction 20 of this invention wherein the rounded end part 43 on the stem 23 does not readily become razored by water flow through the hose construction 20 as in prior known devices and thereby the end 43 does not cut into the hose 21 when the hose 21 is flexed relative to the stem 23 in the manner illustrated by pantom lines in FIG. 4.

It is believed that the hose construction 20 of this invention will outlast the standard inlet hose construction in a washing machine application thereof by almost eight to ten times because the rounded end 43 of this invention prevents a cutting into the hose 21 by the end part 43 of the stem 23 thereof.

Also it has been found that in the one working embodiment of this invention, the fitting on the end 22 of the hose construction 20 can withstand a pull of almost 500 pounds.

Therefore, it can be seen that this invention not only provides a new hose construction and a new method of making the same, but also this invention provides a new metallic stem for such a hose construction and a new method of making such a stem.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a hose construction for conveying water under pressure and comprising a flexible tubular hose having opposed ends, a metallic stem having opposed ends and having one of said ends thereof disposed in one of said ends of said hose, and a metallic tubular ferrule telescoped on said one end of said hose and being radially inwardly crimped toward said stem to compress said end of said hose between said ferrule and said stem, said one end of said stem having a plurality of annular spaced apart projections thereon and respectively having external peripheral surfaces embedded into said one end of said hose, said stem having an opening passing therethrough and defining an interal peripheral surface thereof, said one end of said stem terminating at an end edge thereof that is defined by said internal peripheral surface joining with said external peripheral surface of an adjacent annular projection that has an outer apex, said end edge defining a relatively large rounded end part on said stem, said ferrule having opposed ends, one end of said ferrule being interconnected to said stem outboard of said one end of said hose, the improvement wherein said ferrule has the other end thereof provided with a portion thereof that is angled radially outwardly from said hose and terminates at an uncrimped end edge thereof that is disposed generally short of said outer apex of said adjacent annular projection so as to tend to prevent said outer apex from cutting into said hose when said hose is bent relative to said outer apex.

2. A hose construction as set forth in claim 1 wherein said adjacent projection has two external peripheral sides merging together to form said outer apex thereof, one of said sides joining with said end edge of said stem.

3. A hose construction as set forth in claim 2 wherein said one side of said adjacent projection is substantially flat and slopes at an angle of approximately 7 degrees relative to a longitudinal axis of said stem.

4. A hose construction as set forth in claim 3 wherein the other side of said adjacent projection is substantially flat and slopes at an angle of approximately 30 degrees relative to the longitudinal axis of said stem.

5. A hose construction as set forth in claim 4 wherein said internal peripheral surface of said stem defines a diameter that is approximately 0.380 of an inch and said outer apex of said adjacent projection defines a diameter that is approximately 0.560 of an inch.

6. A hose construction as set forth in claim 1 wherein said adjacent projection has two external peripheral sides merging together to form said outer apex thereof, one of said sides joining with said end edge of said stem.

7. A hose construction as set forth in claim 6 wherein said one side of said adjacent projection is substantially flat and slopes at an angle of approximately 7 degrees relative to a longitudinal axis of said stem.

8. A hose construction as set forth in claim 7 wherein the other side of said adjacent projection is substantially flat and slopes at an angle of approximately 30 degrees relative to the longitudinal axis of said stem.

9. A hose construction as set forth in claim 8 wherein said internal peripheral surface of said stem defines a diameter that is approximately 0.380 of an inch and said outer apex of said adjacent projection defines a diameter that is approximately 0.560 of an inch.

* * * * *